United States Patent
Silver et al.

(10) Patent No.: US 7,599,482 B2
(45) Date of Patent: *Oct. 6, 2009

(54) SYSTEMS AND METHODS FOR CALLER-CONTROLLED TUNE NOTIFICATION OF A CALL

(75) Inventors: Edward Michael Silver, Atlanta, GA (US); Linda Ann Roberts, Decatur, GA (US); Hong Thi Nguyen, Atlanta, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 80 days.

This patent is subject to a terminal disclaimer.

(21) Appl. No.: 11/717,278

(22) Filed: Mar. 13, 2007

(65) Prior Publication Data
US 2007/0189504 A1   Aug. 16, 2007

Related U.S. Application Data

(63) Continuation of application No. 10/279,352, filed on Oct. 24, 2002, now Pat. No. 7,197,135.

(51) Int. Cl.
*H04M 3/42* (2006.01)
(52) U.S. Cl. .............................. 379/373.02; 379/207.16
(58) Field of Classification Search ............ 379/207.16, 379/373.01, 373.02, 373.03, 374.01, 374.02, 379/375.01
See application file for complete search history.

(56) References Cited

U.S. PATENT DOCUMENTS

| | | | |
|---|---|---|---|
| 5,103,475 A | 4/1992 | Shuen ........................ 379/115 |
| 5,384,831 A | 1/1995 | Creswell et al. | |
| 5,442,692 A | 8/1995 | Yamazaki et al. ........... 379/253 |
| 5,544,229 A | 8/1996 | Creswell et al. | |
| 5,995,603 A | 11/1999 | Anderson .................... 379/142 |
| 6,134,311 A | 10/2000 | Ekstrom ..................... 379/201 |
| 6,252,953 B1 | 6/2001 | Gruchala et al. ............ 379/207 |
| 6,314,306 B1 | 11/2001 | Harris | |
| 6,327,354 B1 | 12/2001 | Pelletier et al. ........ 379/201.01 |
| 6,332,021 B2 | 12/2001 | Latter et al. ............ 379/142.01 |
| 6,366,791 B1 | 4/2002 | Lin et al. .................... 455/567 |

(Continued)

OTHER PUBLICATIONS

Softswitch Model Drives New Age of Customized Communication, A CommWorks Position Paper, www.softswitch.org/educational/reference.asp, in existence at least as of Sep. 9, 2002.

(Continued)

*Primary Examiner*—Walter F Briney, III
(74) *Attorney, Agent, or Firm*—Cantor Colburn LLP

(57) ABSTRACT

A system and method for a caller to control a tune notification for a telephone call includes a service switching point and a service control point. The service switching point is operable to receive a tune notification service access code and a called directory number, and to issue a query in response to receiving the service access code. The service control point is operable to receive the query and issue a response including a tune notification signal to the service switching point. Upon receiving the response from the service control point, the service switching point processes the call so that the tune notification signal causes the tune notification to be applied to a called telephone line associated with the called directory number.

20 Claims, 4 Drawing Sheets

U.S. PATENT DOCUMENTS

| | | | |
|---|---|---|---|
| 6,381,594 B1 | 4/2002 | Eichstaedt et al. | |
| 6,418,330 B1 | 7/2002 | Lee | 455/567 |
| 6,650,746 B1 * | 11/2003 | Groen et al. | 379/207.16 |
| 6,658,455 B1 | 12/2003 | Weinman, Jr. | 709/203 |
| 6,697,470 B2 | 2/2004 | McDonough | 379/142.01 |
| 6,707,908 B1 | 3/2004 | Nagasawa | 455/567 |
| 6,804,289 B2 | 10/2004 | Takahashi | 375/132 |
| 6,999,752 B2 | 2/2006 | Fukaya | 455/412.1 |
| 7,031,453 B1 | 4/2006 | Busardo | 379/373 |
| 7,197,135 B1 * | 3/2007 | Silver et al. | 379/373.02 |
| 2002/0058521 A1 * | 5/2002 | Yamada et al. | 455/458 |
| 2002/0094076 A1 | 7/2002 | Chen | 379/373.01 |
| 2002/0172338 A1 | 11/2002 | Lere et al. | 379/142 |
| 2004/0037403 A1 | 2/2004 | Koch | 379/142.2 |
| 2004/0067751 A1 | 4/2004 | Vandermeijden et al. | 455/414.1 |

OTHER PUBLICATIONS

International Softswitch Consortium Reference Architecture, Softswitch Consortium, v. 1.2, Jun. 2002.

ISC Reference Architecture—Functional Plans, Softswitch Consortium, v. 1.0, Jan. 2002.

U.S. Appl. No. 10/201,043, filed Jul. 23, 2002, entitled "Tune Master Telephone", Inventors: Edward Silver, Linda Roberts and Hong Thi Nguyen.

U.S. Appl. No. 10/135,668, filed Apr. 30, 2002, entitled "System and Method for Caller Control of a Distinctive Ring", Inventors: Hong Thi Nguyen, Linda Roberts and Edward Silver.

U.S. Official Action dated Dec. 15, 2004 in connection with U.S. Appl. No. 10/201,043.

U.S. Official Action dated Sep. 9, 2004 in connection with U.S. Appl. No. 10/135,668.

U.S. Official Action dated Jun. 14, 2005 in connection with U.S. Appl. No. 10/201,043 (11 pages).

Copending U.S. Appl. No. 10/279,352, filed Oct. 24, 2002, entitled "Systems and Methods for Caller-Controlled Tune Notification of a Call" with copy of Official Filing Receipt dated Nov. 20, 2002.

* cited by examiner

_US 7,599,482 B2_

SYSTEMS AND METHODS FOR CALLER-CONTROLLED TUNE NOTIFICATION OF A CALL

RELATED APPLICATIONS

This application is a Continuation of U.S. application Ser. No. 10/279,352 entitled "Systems and Methods for Caller-Controlled Tune Notification of a Call" filed Oct. 24, 2002, now U.S. Pat. No. 7,197,135 which application relates to patent applications U.S. patent application Ser. No. 10/135,668, filed on Apr. 30, 2002, and entitled "System and Method for Caller Control of a Distinctive Ring," and U.S. patent application Ser. No. 10/201,043, filed on Jul. 23, 2002, entitled "Systems and Methods for a Tune Master Telephone," each of which are incorporated herein by reference.

NOTICE OF COPYRIGHT PROTECTION

A portion of the disclosure of this patent document and its attachments contain material, which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

FIELD OF THE INVENTION

The present invention relates generally to the field of telecommunications, and more particularly, to systems and methods for caller-controlled tune notification of a call.

BACKGROUND OF THE INVENTION

When placing a call to a called party, a caller may often desire to provide an indication of his or her identity to the called party, or to attract the attention of the called party so that the called party is more likely to answer the telephone. A limitation of using conventional rings to identify a caller is that there is a limited number of ring tones and sequences available. In contrast, the number of musical tunes that could be used to associate an incoming call with a particular caller is almost limitless. A tune selected from a wide range of tunes could be used to associate a call with a calling party. As such, it would be advantageous to utilize tunes to identify a calling party. Additionally, particular types of tunes can be associated with particular callers. For example, the tune of a love song could be associated with a call receiver's spouse, a classical tune with one's parents, a dark tune with one's boss, and so on.

In conventional telephone network systems, control of notification rings, including musical tunes, is restricted to call recipients. Such systems do not allow a caller to control the tune played as notification of an incoming call from the caller.

Tune notification controlled by a caller would allow a caller to identify the caller to a call recipient using a unique tune. In addition, call notification with tunes controlled by a caller would allow a caller to select a tune that corresponds with an emotion likely to be evoked by the call content. For example, a caller could associate a happy tune with a happy message call, a serious tune with a business call, a playful or light-hearted tune with a surprise message call, and so on.

Thus, there is a need for systems and methods for caller-controlled tune notification of a call.

SUMMARY OF THE INVENTION

In an embodiment of the present invention, a system for caller control of a tune notification comprises a service switching point (SSP) operable to receive a service access code (SAC) for a tune notification service and a called directory number (DN) input by a calling party placing a call and to issue a query in response to receiving the service access code. The system includes a service control point (SCP) in communication with the service switching point over a communication path and is operable to receive the query and issue a response including a tune notification signal to the service switching point. Upon receiving the response from the service control point, the service switching point processes the call so that the tune notification signal causes the tune notification to be applied to a called telephone line associated with the called directory number. In one embodiment, the system comprises, upon receiving the query from the service switching point, the service control point providing a list of tunes from which the calling party can select a desired tune to be used as notification of the call. Embodiments of the present invention can be implemented in a circuit-based telephone network or a packet-based telephone network.

In another embodiment, the service switching point is operable to receive an authorization code and include the authorization code in the query, and the service control point is further operable to determine whether the authorization code is valid and provide the tune notification signal only upon determining that the authorization code is valid. In embodiments, the authorization code comprises a unique code associated with the called directory number. In other embodiments, the authorization code comprises a unique code associated with the calling party. Accordingly, tracking of tune notification service usage can be accomplished for purposes of billing.

A system of the present invention includes embodiments wherein the service switching point is operable to issue the query independent of a calling telephone line from which the service access is received. As a result, a caller can access the tune notification service from any call originating device in the same network or a different network as the called line directory number. In embodiments, the tune notification signal causes the tune notification to be applied to the called telephone line independent of services associated with the called telephone line.

A tune notification service of the present invention may include a plurality of tunes accessible to tune notification service subscribers for storing on a call terminating device. In a preferred embodiment, a call terminating device associated with the called directory number is operable to play the tune notification upon receiving the tune notification signal. In embodiments, the tune notification signal triggers playing a tune stored in a call terminating device. In alternative embodiments, the tune notification signal comprises the tune notification.

Embodiments of the present invention include methods of processing a call placed by a calling party to a called telephone line in a telephone network. The telephone network comprises a service switching point, in communication with a service control point. One such method comprises the steps of receiving at the service switching point a tune notification service access code and a called directory number, the call directory number associated with the called telephone line; and sending a query from the first service switching point to the service control point after receiving the service access code. The method further comprises generating a response, including a tune notification signal, to the query at the service control point; sending the response to the switching point; processing the call at the service switching point after receiving the tune notification signal; and applying the tune notification signal to the called telephone line.

In embodiments, a method of the present invention further comprises the steps of receiving at the service switching point an authorization code; including the authorization code in the query; determining at the service control point whether the authorization code is valid or invalid; and providing the tune notification signal if the authorization code is valid. The authorization code can be associated with the called directory number and/the calling party directory number.

Features of a caller-controlled tune notification of a call of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

Systems and methods for a caller-controlled tune notification of a call of the present invention provide numerous advantages over prior messaging systems. For example, embodiments of the present invention advantageously provide for control of a tune notification on a called line by a caller.

Another advantage is that the present invention provides a large number of musical tunes that a particular caller can used to associate an incoming call with the caller. Additionally, the present invention provides the benefit of associating particular types of tunes with particular callers.

Another advantage is that the present invention allows a caller to control tune notification so as to select a tune that corresponds with an emotion likely to be evoked by the call message.

Another advantage is that the present invention provides for use of a tune notification service independent of other services associated with a called line number.

Still another advantage is that the present invention allows a tune notification service subscriber to control application of tune notifications to a called line number by authorization codes.

As will be realized by those of skill in the art, many different embodiments of systems an d methods a caller-controlled tune notification of a call according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

Figure 1:
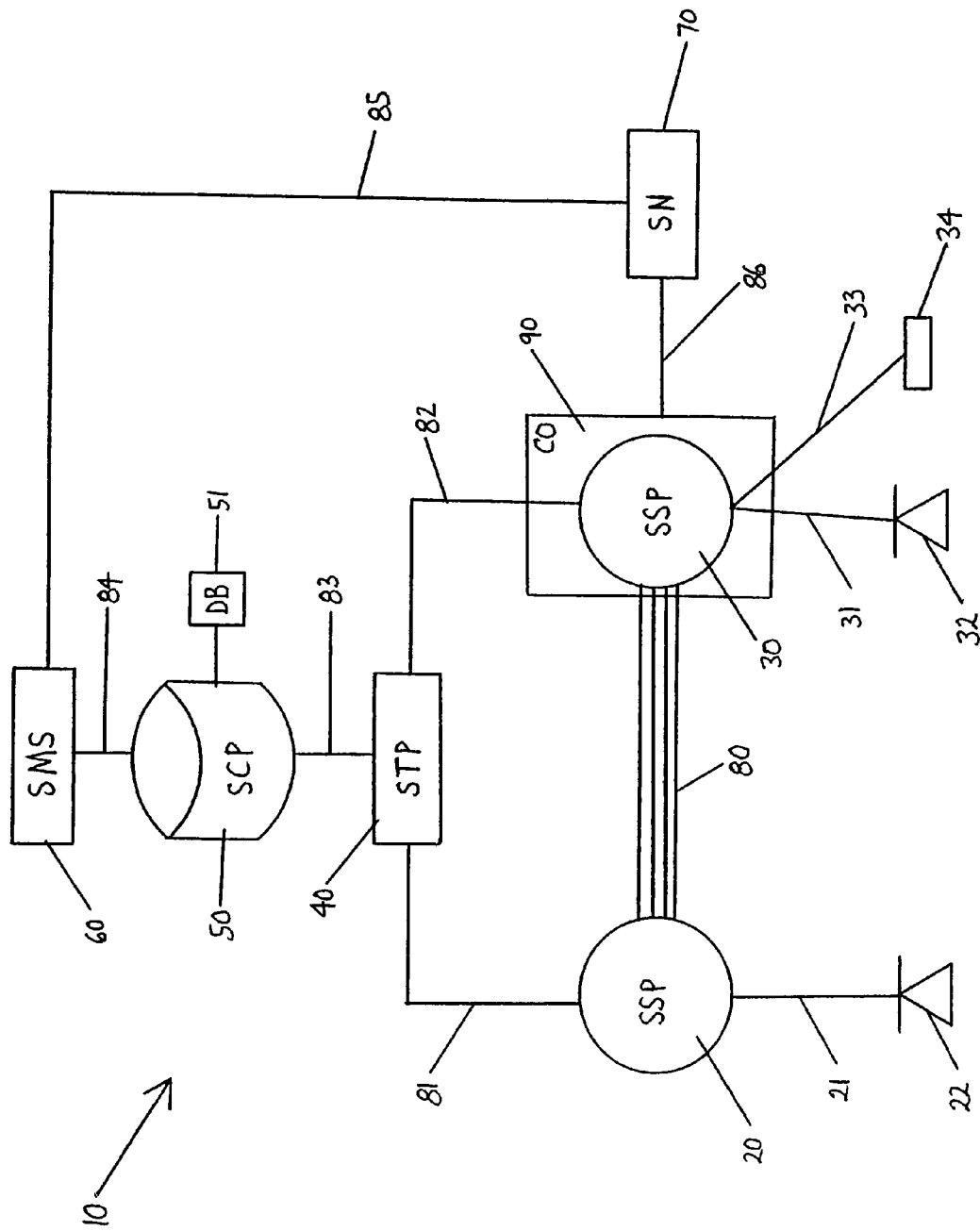
FIG. 1 is block diagram of an exemplary telecommunications network environment in an embodiment of the present invention.

Embodiments of the present invention comprise systems and methods for a caller to control tune notification of a call. In one embodiment, when placing a call to a called directory number in a telephone network, a caller accesses a tune notification service by dialing a service access code. Accessing the tune notification service and selecting a tune causes a signal associated with the selected tune to be applied to a called telephone line associated with the called directory number. The signal for the selected tune in turn causes a terminating device connected to the telephone line, such as a telephone, to play the selected tune as notification of the call. FIG. 1 is a block diagram of an exemplary telecommunications network environment of one such embodiment of the present invention.

Referring now to FIG. 1, an Advanced Intelligent Network (AIN) 10 comprises Service Switching Points (SSP) 20 and 30, a Signal Transfer Point (STP) 40, a Service Control Point (SCP) 50, a Service Management System (SMS) 60, a Service Node (SN) 70, and a Central Office 90. The first SSP 20 and second SSP 30 are connected by trunk circuits 80. The first SSP 20 is connected to the STP 40 by a first signaling link 81, and the second SSP 30 is connected to the STP 40 by a second signaling link 82. Similarly, the STP 40 is connected to the SCP 50 by a signaling link 83; the SCP 50 is connected to the SMS 60 by a signaling link 84; and the SMS 60 is connected to the SN 70 by a signaling link 85. The SN 70 is also connected to the SSP 20 located in the Central Office 90 by a signaling link 86.

A service switching point is defined as a PSTN switch (such as an End Office) that can recognize intelligent network calls and route and connect such calls under the direction of a service control point (SCP). The first SSP 20 is operable to receive a tune notification service access code and the called directory number input by the calling party, and is further operable to issue a query in response to receiving the service access code. The SCP 50 is operable to receive the query and issue a response to the first SSP 20. The response includes a tune notification signal. Upon receiving the response from the SCP 50, the first SSP 20 processes the call so that the tune notification signal causes a selected tune notification to be applied to a called telephone line associated with the called directory number.

Communications in the AIN network 10 occur over the trunk circuits 80 and the signaling links 81, 82, 83, 84, 85, and 86. These communications utilize the Signaling System 7 (SS7) communications protocol and the AIN communications protocol. The trunk circuits 80 are the voice path trunks, or voice channels, over which voice and data communications between a calling party and called party are established when calls are connected. The signaling links 81, 82, 83, 84, 85, and 86 are bi-directional channels employing the SS7 protocol. Typically, the signaling links 81, 82, 83, 84, 85, and 86 transmit SS7 messages at a 56 or 64 kilobit per second (kbps) rate. This is referred to as out-of-band signaling because the signaling does not take place over the voice channels in the trunk circuits 80.

The first SSP 20 serves a dedicated group of telephone lines. Telecommunication customers subscribe to one or more of these telephone lines. The telephone lines connect the first SSP 20 to terminating devices, such as telephones or electronic communication devices (for example, device 34). As shown in FIG. 1, a telephone line 21 connects the first SSP 20 to a telephone 22. Likewise, the second SSP 30 also serves a dedicated group of telephone lines, including telephone line 31, which connects the second SSP 30 to a telephone 32, and telephone line 33, which connects the second SSP 30 to an electronic communication device 34. The electronic communication device 34 can be a facsimile machine, computer modem, or other electronic communication devices designed to transmit electronic communication data over a voice channel.

Each of the telephone lines 21, 31, and 33 is assigned a directory number. A directory number is a number that is dialed or input by an originating device at a calling telephone line to reach a terminating device on a called telephone line associated with the directory number. Thus, a directory number is typically input into a telephone or electronic communication device to establish a voice channel to another telephone or electronic communication device attached to the network.

The first SSP 20 and the second SSP 30 are connected to the STP 40 via the signaling links 81 and 82, respectively. The STP 40 is a multi-port, high speed packet switch that that converts dialed digits to data messages and routes each incoming message to an outgoing signaling link based on routing information contained in the SS7 message.

The STP 40 is connected to the SCP 50 via the signaling link 83. The SCP 50 contains programmable service-independent capabilities (or service logic) that are under control of telephone service providers. A service control point comprises a database in an AIN network that supplies the translation and routing data needed to deliver advanced network services. The SCP 50 comprises a database 51 that includes subscription information, authorization codes, passwords, notification tunes, etc. Interactions related to the tine notification service occur at the SCP.

The SCP 50 is connected to the SMS 60 via the signaling link 84. The SMS 60 interfaces with the central offices of the telephone service providers and provides a platform for remotely provisioning the SCP 50 to provide advanced call-processing capability to a subscriber. Thus, when a customer subscribes to certain AIN services, or modifies a group of AIN services, the telephone service provider provides this information to the SCP 50 via the SMS 60.

The SMS 60 is connected to the SN 70 via the signaling link 85. The SN 70 includes voice and dual tone multi-frequency (DTMF) signal recognition devices and voice synthesis devices. The SN 70 is connected to the telecommunications network Central Office (CO) 90 and the SSP 30 via the signaling link 85. The SN 70 is typically employed in an AIN service to provide voice channel connection to a call or transfer data to a subscriber over a switched connection during or after a call.

A caller may place a call to a directory number served by the same SSP from which the call is placed, or may place a call to a directory number served by a different SSP from which the call is placed. Upon completion of the call, the network system 10 rings the called line by providing a ring signal, or a tune notification signal, to the called telephone line, for example, the line 31, associated with the called directory number. Receipt of the tune notification signal causes a terminating device connected to the called line, for example, telephone 32, to ring.

As shown in FIG. 1, in one aspect, the present invention may be implemented in an AIN network 10. From telephone 22, the calling party dials a service access code (SAC) for the tune notification service, followed by the calling line directory number that the calling party wishes to call. The service access code comprises the asterisk key followed by a number, referred to as a "star code" (for example, *88). An example of a service access code is "*88-404-555-1212." When the calling party dials the service access code and directory number (DN), an initial address message (IAM) is created. An initial address message comprises a message that seizes an outgoing circuit and transmits address and other information relating to the routing and handling of a call. In the network 10 in FIG. 1, the initial address message created by the calling party includes calling party identification information, the calling line directory number, and the service access code. Dialing the service access code triggers the service switching point 20 to send the IAM, including the service access code signal, through the signal transfer point 40 to the service control point 50.

Embodiments of the present invention comprise authorization of a calling party to send a unique tune to a particular calling line directory number. Authorization prevents unwanted callers from notifying a call receiver with a tune. Authorization to send tune notification calls to a called party can be controlled by the called party. In order to control receipt of tune notification calls, a tune notification service subscriber could enable selected other parties to send tune notification calls to the subscriber's directory number. Subscribers can enable other parties' authorization by revealing an authorization code those persons. Alternatively, subscribers can enable other parties' authorization by identifying to the telephone company providing the tune notification service which parties are authorized to send tune notifications to the subscriber. Authorization codes can be associated with a calling party such that when the calling party dials the service access code and a calling line directory number, the initial address message thusly created also includes the calling party's authorization code as part of the calling party identification information.

Authorization occurs through validation of an association of the calling party with an authorization code in a network database. In the embodiment in FIG. 1, service switching point 20, in response to receiving the service access code, issues a query to the service control point 50 the service control point 50 collects the caller's authorization code and/or password from the database 51 to determine whether the caller has a valid authorization to send a tune notification call to the directory number entered by the caller. In response to the authorization query, the service control point 50 issues a response to the service switching point 20.

Once authorization for the caller to send a tune notification call to the directory number is validated, the service control point 50 activates a software application in response to send to the calling party's telephone a list of available tunes from which a desired tune can be selected. The list of tunes can be sent to the calling party's telephone using an interactive voice program wherein the list of tunes is automatically read by a text-to-speech synthesizer. The caller selects a tune from the menu of tune options read by the SCP speech synthesizer by entering the number on the telephone keypad associated with the desired tune. Alternatively, the SCP 50 sends a signal to the service node 70, which activates a software application that then provides a list of available tunes from which a desired tune can be selected to the calling party's telephone. The service node 70 sends electronic signals representing a list of tunes that are displayed on a screen on the caller's telephone. The caller selects a tune by entering the number on the telephone keypad associated with the desired tune.

In the embodiment in FIG. 1, the network service node 70 comprises a conventional phone-based menuing system. The service node 70 provides announcements, or recorded messages, related to the tune notification service, to guide a caller through a menu of options leading to selection of a tune. For example, the service node 70 provides the announcement "Select a category of tunes" to the caller. Categories of tunes may include love songs, classical music, patriotic tunes, and so on. When the caller selects a desired category of tunes, the service node 70 then announces "Select a tune." The caller continues through the menu of announcements until a tune is selected.

After the caller selects a tune, the call, including the initial address message and the signal for the selected tune notification, is sent from the service control point 50 through the signal transfer point 40 to the telecommunications network central office (CO) 90. The central office 90 comprises a service node 70 that serves as an application server providing tune notification service functions between the SMS 60 and the calling line telephone. The service node 70 includes a database comprising subscription information, authorization codes, passwords, notification tunes, etc.

The central office 90 then sends a tune notification signal to the telephone 32 associated with the called party's directory number. In the embodiment in FIG. 1, the called party telephone 32 is enabled to play the tunes sent by a tune notification service. Such an enabled telephone comprises memory containing the tunes to be played as a call notification and a means for playing the tunes. The means for playing tune notification tunes can be an audio player driven by a software application. In response to receiving a tune notification signal from the SCP 50 through the SSP 30, the called party telephone activates the software application to play tunes and to play the specific tune triggered by the tune notification signal. The called party telephone 32 then plays the tune stored in the telephone memory, alerting the called party of a call and/or a particular type of call from the calling party.

In embodiments, a telecommunications company provides the tunes in a database from which subscribing customers can access and record selected tunes. Customers wishing to receive tune notification calls can dial a number assigned to the tune database. The telecommunications company provides a conventional phone-based menuing system for customers to navigate through the database options. After a customer dials the assigned tune notification service database directory number, the customer follows the prompts in the menu and selects the desired tunes. When the menu prompts the customer to record a selected tune, the tune is recorded on the customer's recording-enabled telephone. Thereafter, when the customer receives a tune notification call, the customer's telephone plays the appropriate tune from the tune recording on the telephone. In other embodiments in which a customer's telephone is connected to the telecommunications company with a digital connection, the customer can download selected tunes from a provided database in electronic format.

In other embodiments, an enabled telephone comprises a means for playing tune notification tunes and a means for reading storage media containing such tunes. In such an embodiment, storage media containing the tunes to be played are obtained by the end user and connected to the telephone for playing upon activation by a tune notification signal. Both tunes recorded from a network database and tunes in portable storage media, such as a compact disc, can be provided by a telecommunications network to called party users on a free or paid basis.

In the embodiment in FIG. 1, the network service switching point 30 utilizes frequency shift keying (FSK) to transmit the initial address message and tune notification signal for the call to the called party telephone 32. Frequency shift keying is a modulation technique for transmitting data in digital format over an analog carrier.

The tune notification signal, transmitted by a frequency shift keying technique, triggers the called telephone 32 to play the indicated tune. In this manner, a called party receives notification of a call in which the notification is a tune selected by the caller. By using frequency shift keying techniques, the tune notification signal carries only a trigger to activate the enabled telephone to play the selected tune, rather than sending the entire tune file with the call signal.

In other embodiments, the service control point 50 comprises a self-searching database architecture that recognizes authorization for a particular person, rather than only authorization of a telephone associated with a caller's directory number. Particular parties authorized to use a tune notification service for a certain calling line number are associated with the calling line number in the database. Because the authorization code identifies the calling party, the calling party can use the tune notification service from any telephone in the network. In this manner, a network would allow remote access for an individual having authorization for use of the tune notification service.

Figure 2:
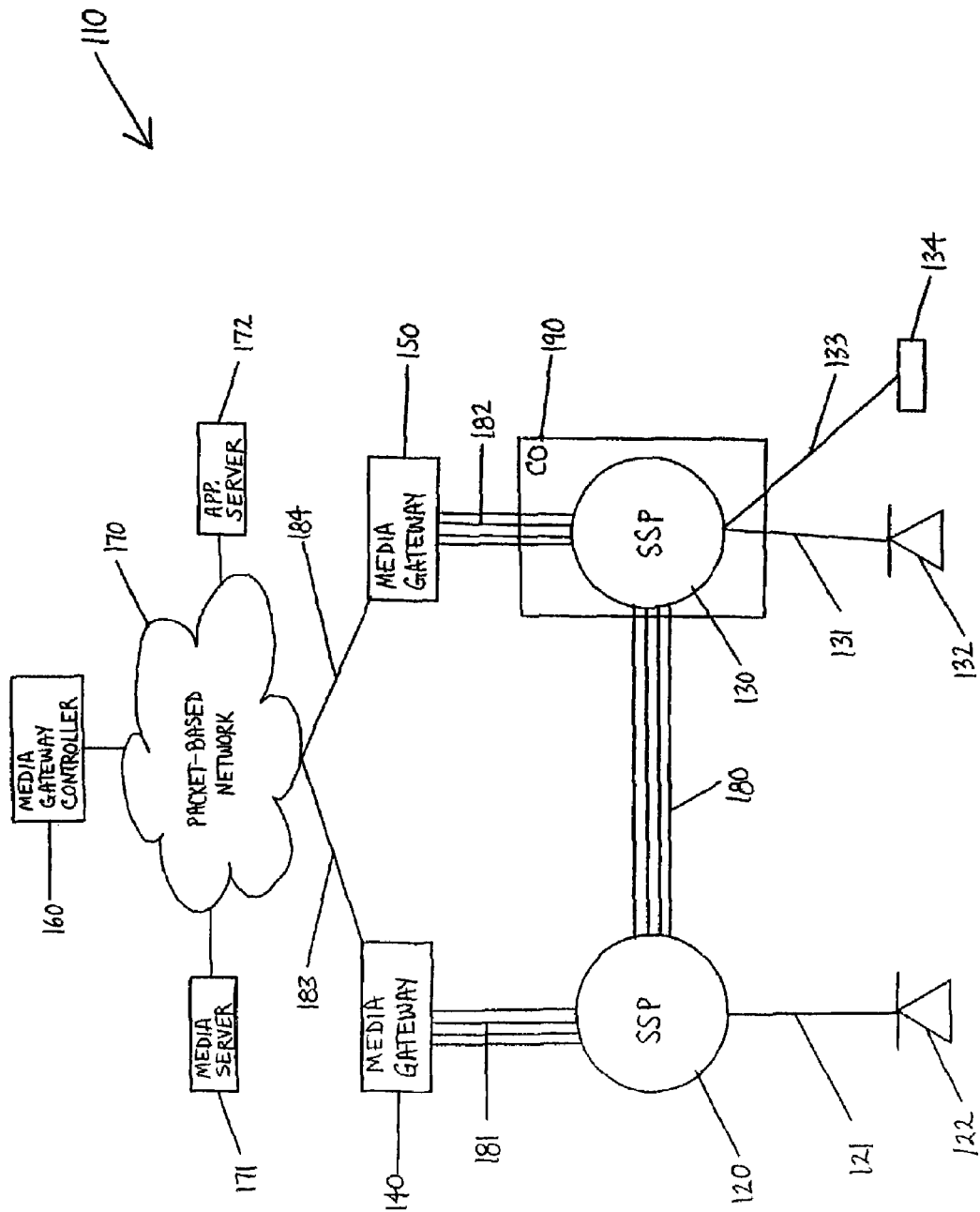
FIG. 2 is a block diagram of an exemplary telecommunications network environment including a packet-based network in an embodiment of the present invention.

A shown in FIG. 2, an embodiment of the present invention may be implemented in a packet-based network. Packet-based network system 110 comprises Service Switching Points (SSP) 120 and 130, Media Gateways 140 and 150, a packet-based network 170 (for example, the Internet), Media Gateway Controller 160, Media Server 171, Application Server 172, and a Central Office 190. The SSP 120 and SSP 130 are connected by trunk circuits 180. The SSP 120 is connected to the Media Gateway 140 by a trunk circuit 181, and the SSP 130 is connected to the Media Gateway 150 by a trunk circuit 182. Similarly, Media Gateways 140 and 150 are connected to the packet-based network 170 by the signaling links 183 and 184, respectively. The packet-based network 170 is connected to the Media Server 171, the Application Server 172, and the Media Gateway Controller 160, as depicted in FIG. 2.

The SSP 120 is operable to receive a tune notification service access code and the called directory number input by the calling party, and is further operable to issue a query in response to receiving the service access code. The Media Gateway Controller 160 serves as a service switching point in the packet-based network 170, and is operable to receive the query and trigger a response; including a tune notification signal, to the SSP 120. Upon receiving the response, the SSP 120 processes the call so that the tune notification signal causes a selected tune notification to be applied to the called telephone line associated with the called directory number.

Communications in the packet-based network system 110 occur over the trunk circuits 180, 181, and 182, and the signaling links 183 and 184. These communications utilize a packet-based protocol, such as the IP protocol, and the AIN communications protocol. The trunk circuits 180, 181, and 182 are the voice path trunks, or voice channels, over which voice and data communications between a calling party and called party are established when calls are connected.

The SSP 120 serves a dedicated group of telephone lines. Telecommunication customers subscribe to one or more of these telephone lines. The telephone lines connect the SSP 120 to terminating devices, such as telephones or electronic communication devices, for example, device 134. As shown in FIG. 2, a telephone line 121 connects the SSP 120 to a telephone 122. Likewise, the SSP 130 also serves a dedicated group of telephone lines, including telephone line 131, which connects the SSP 130 to a telephone 132, and telephone line 133, which connects the SSP 130 to an electronic communication device 134. The electronic communication device 134 can be a facsimile machine, computer modem, or other electronic communication devices designed to transmit electronic communication data over a voice channel. Each of the telephone lines 121, 131, and 133 is assigned a directory number.

The SSP 120 and the SSP 130 are connected to the Media Gateways 140 and 150, respectively. A gateway is an node, or point of connection, providing an interface between two communications networks. The calling party/packet-based network Media Gateway 140 packetizes data into packets and delivers the packets to the packet-based network 170. The packet-based network 170 is connected to a telecommunications network central office 190 through a separate Media Gateway 150. The packet-based network/called party Media Gateway 150 converts the packetized data from the packet-based network 170 to signals compatible with the PSTN.

The Media Gateways 140 and 150 are connected to the packet-based network 170 via the signaling links 183 and 184, respectively. In the packet-based network 170, the Media Gateway Controller 160 manages signaling and control interfaces between the circuit-switched (PSTN) network and the packet-switched (IP) network. The Media Server 171 contains programmable service-independent capabilities (or service logic) that are under control of telephone service providers. The Media Server 171 provides tune notification service interactions, including announcements to guide a caller through a tune selection process. The Media Server 171 functions utilize a protocol compatible with the packet-based network. The Application Server 172 operates in a manner similar to a service control point and comprises a database that includes subscription information, authorization codes, passwords, notification tunes etc. Interactions related to the tune notification service occur at the Media Server 171 and the Application Server 172.

A caller may place a call to a directory number served by the same SSP from which the call is placed, or may place a call to a directory number served by a different SSP from which the call is placed. Upon completion of the call, the network system 110 rings the called line by providing a ring signal, or a tune notification signal, to the called telephone line, for example, the line 131, associated with the called directory number. Receipt of the tune notification signal causes a terminating device connected to the called line, for example, telephone 132, to ring.

Referring to the embodiment in FIG. 2, a calling party is assigned an authorization code. The calling party dials a service access code (SAC) for a tune notification service, followed by the directory number of the called party. The access code can be a "star code," that is, the asterisk key followed by a number. When the service access code and directory number are dialed, the initial address message (JAM) sent from the caller's telephone 122 includes the service access code and the caller's authorization code, as well as the called directory number. Dialing the access code triggers the SSP 120 to route the initial address message, including the service access code signal, through the Media Gateway 140 connected to the packet-based network 170. The calling party/packet-based network Media Gateway 140 converts the initial address message to a packet-based message. In particular, the calling party/packet-based network Media Gateway 140 converts data in the initial address message to a session initiation protocol (SIP) to establish a telephony session with the packet-based network 170 using the packet-based message. In addition, the SSP 120 sends a query requesting validation of an authorization code to the Media Gateway Controller 160.

When the query is received by the packet-based network 170, the Media Gateway Controller 160 triggers the Application Server 172 to collect the caller's authorization code and/or password from a database in the Application Server 172 to determine whether the caller has a valid authorization to send a tune notification call to the directory number entered by the caller. Once authorization for the caller to send a tune notification call to the directory number is validated, the Application Server 172 provides to the caller a list of tunes from which a desired tune can be selected.

The caller selects a tune from a list of tunes provided by the Application Server 172 and displayed on a screen on the caller's telephone 122. In other embodiments, a telephony session with a packet-based network is initiated from a packet-based telephone using a personal computer. In such embodiments, the list of tunes provided by the packet-based network application server is displayed on a personal computer monitor. A tune is then selected by entering the number on the telephone keypad or computer keyboard associated with the desired tune.

After the caller selects a tune, the call, including the initial address message and the selected tune notification data, is sent by the Media Gateway Controller 160 from the packet-based network to the packet-based network/called party Media Gateway 150. The packet-based network/called party Media Gateway 150 converts the packet-based message into circuit-based signals compatible with the PSTN and routes the circuit-based signals to the telecommunications network central office 190. The central office 190 then sends the initial address message and a signal for the selected tune notification to the telephone 132 associated with the called party's directory number. The called party telephone 132 then plays the tune stored in the telephone memory alerting the called party of a call and/or a particular type of call from the calling party.

The called party telephone 132 is enabled to play the tunes sent by a tune notification service. The enabled telephone comprises memory containing the tunes to be played as a call notification and a means for playing the tunes. The tune notification signal triggers the called telephone to play the indicated tune. In this manner, a called party receives notification of a call in which the notification is a tune selected by the caller.

In the embodiment in FIG. 2, a telecommunications company provides the tunes in a database in the packet-based network Application Server 172. As part of a subscription to the tune notification service, the called party dials up the tune database and downloads the tunes to the tune-enabled telephone. In other embodiments, an enabled telephone comprises a means for playing tune notification tunes and a means for reading storage media containing such tunes. In such an embodiment, storage media containing the tunes to be played are obtained by the end user and connected to the telephone for playing upon activation by a tune notification signal. Both tunes downloaded from a network database and tunes in portable storage media can be provided by a telecommunications network to called party users on a free or paid basis.

In other embodiments, the present invention comprises an asynchronous transfer mode (ATM)-based packet network, for example, as utilized in a broadband integrated service digital network (B-ISDN). ATM is a high bandwidth, low-delay, packet-like switching and multiplexing technique in which cells (fixed-length data units) are presented to a network on a "start-stop" (asynchronous) basis.

In embodiments of the present invention, high-speed transmission connections, such as broadband connections are utilized. In such embodiments, the tunes to be played by a called party telephone are carried with the tune notification call signal. Such a system does not require storing the tunes to be played on called party telephones.

A telecommunications company can offer embodiments of a tune notification service of the present invention to customers on a per-usage basis, or provide fee-based subscriptions having limited or unlimited usage during a billing period. Alternatively, a tune notification service of the present invention can be offered to customers subscribing to a particular telephone service as at service free to the customers. In addition, a tune notification service of the present invention can be bundled with other services offered to customers.

In embodiments of the present invention, a caller may access a tune notification service of a first telecommunications company from a telephone in a second company's network. In the second telecommunications network, a caller would dial a directory number assigned to the tune notification service. A directory number assigned to a tune notification service may be a toll number or a toll-free number. In alternative embodiments, the caller's initial address message dialed from a second network is routed through a service node in a central office of the first (receiving) network. The service node provides a network-to-network interface so that the service access code entered in a different network is recognized and use of the tune notification service is possible from a different network.

Figure 3:
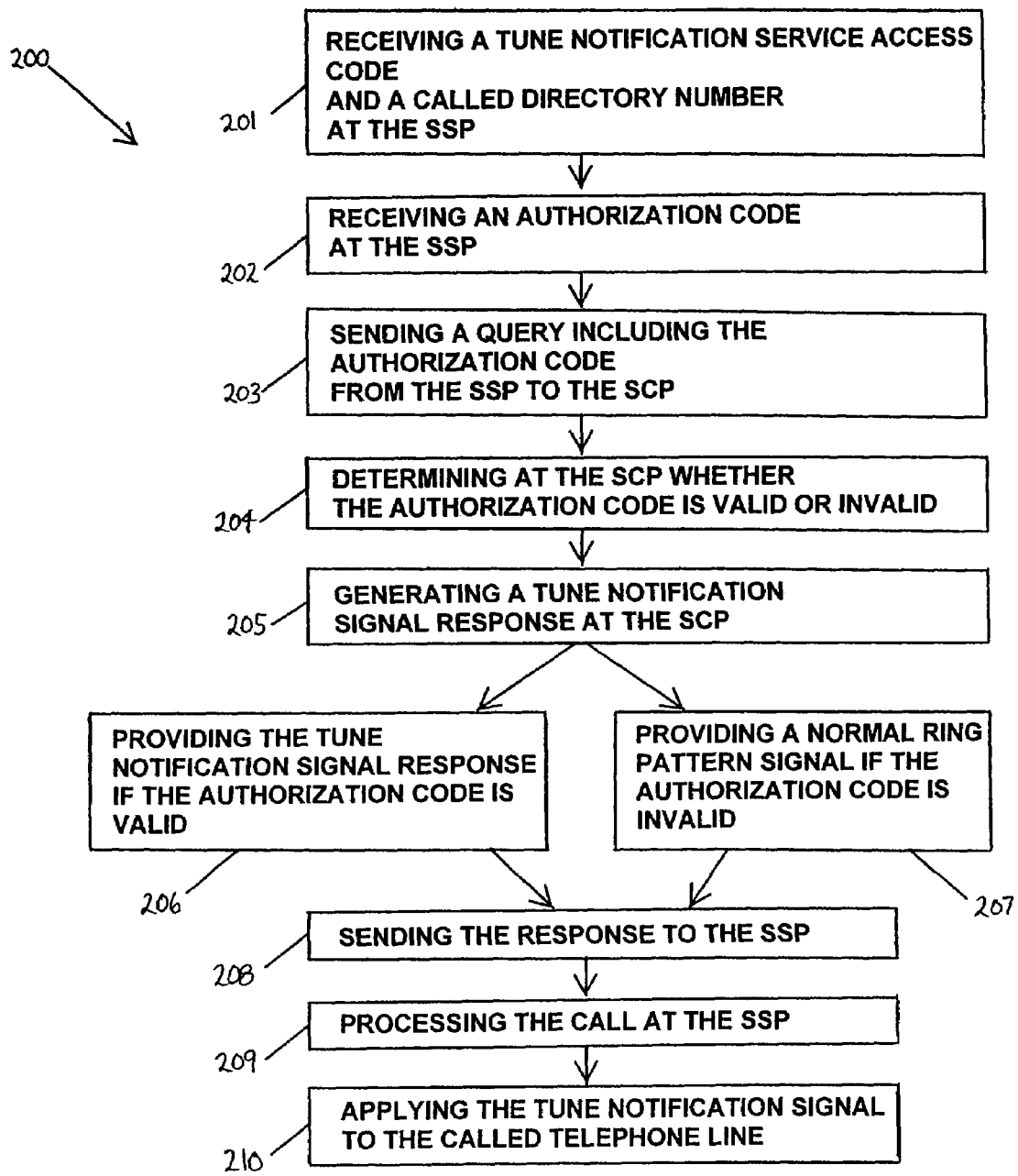
FIG. 3 is flow diagram illustrating a method of processing a call placed by a calling party to a called telephone line in a telephone network in an embodiment of the present invention.

Embodiments of the present invention include methods for caller-controlled tune notification of a call. In the embodiment shown in FIG. 3, a method 200 shows processing a call placed by a calling party to a called telephone line in a telephone network. The network includes a telephone network comprising a service switching point (SSP) and a service control point (SCP). The SCP is in communication with the SSP over a communication path. In the method 200, a calling party dials a tune notification service access code and a called line directory number that the calling party wishes to call. The SSP receives the signal for the tune notification service access code and called directory number (201). The called directory number is associated with the called telephone line. The SSP prompts the calling party to enter an authorization code. The calling party then dials an authorization code, and the SSP receives the authorization code (202).

After the SSP receives the authorization code (202), the SSP then sends a query, including the authorization code, to the SCP (203). The SCP then determines whether the authorization code is valid or invalid (204). To determine validity of the authorization code, the SCP searches a database comprising authorization codes associated with calling party identification information. If the authorization code for sending a tune notification to the called line directory number is associated with the calling party identification information, the SCP validates the called party authorization code. The SCP then generates a response to the query. If the authorization code is validated, the SCP provides a tune notification signal in the response (206). The SCP determines that the authorization code is invalid, the SCP provides a normal ring pattern signal in the response (207). The SCP then sends the response to the SSP (208). After receiving the tune notification signal, the SSP processes the call (209), and the SSP applies the tune notification signal to the called telephone line (210).

In embodiments of a method of tie present invention after receiving the service access code, the SSP sends the query to the SCP independent of a calling telephone line from which the service access code is received. In this manner, a calling party can access the tune notification service from ally telephone in the same telephone network or in a different network. In other embodiments, the SSP applies the tune notification signal to the called telephone line independent of services associated with the called telephone line.

in embodiments of a method of the present invention, the SCP database comprises an association of the called directory number with the authorization code. In other embodiments, the SCP database comprises an association of the calling party directory number with the authorization code. As such, when a calling party dials an authorization code, the SCP runs an application that charges for use of the tune notification service to the appropriate user.

In embodiments of a method, after the SCP determines that the authorization code is valid, the SCP activates a software application in response to send to the calling party's telephone a list of available tunes from which a desired tune can be selected. The list of tunes can be sent to the calling party's telephone using an interactive voice program or with electronic signals representing a list of tunes that are displayed on a screen on the caller's telephone. The caller selects a tune by entering the number on the telephone keypad associated with the desired tune in the voice menu or on the display screen.

In embodiments, a method of the present invention includes a first SSP and a second SSP, wherein the second SSP serves the called telephone line. The first SSP sends the tune notification signal received from the SCP to the second SSP, so that the second SSP can route the signal to the called line number.

In another embodiment of the present invention, a telephone company provides a plurality of tunes accessible to tune notification service subscribers for storing on a call terminating device. A tune notification service subscriber dials up a database comprising the plurality of tunes and downloads tunes to the subscribing electronic communications device. As a result, when a SCP applies a tune notification signal to the device, the device includes the selected tune stored in its memory so that the device can play the selected tune notification.

In an alternative embodiment of a method, the SCP comprises a media server in a packet-based network. In such an embodiment, a media gateway converts data into and out of packets for transmission between a circuit-switched network and the packet-based network.

Figure 4:
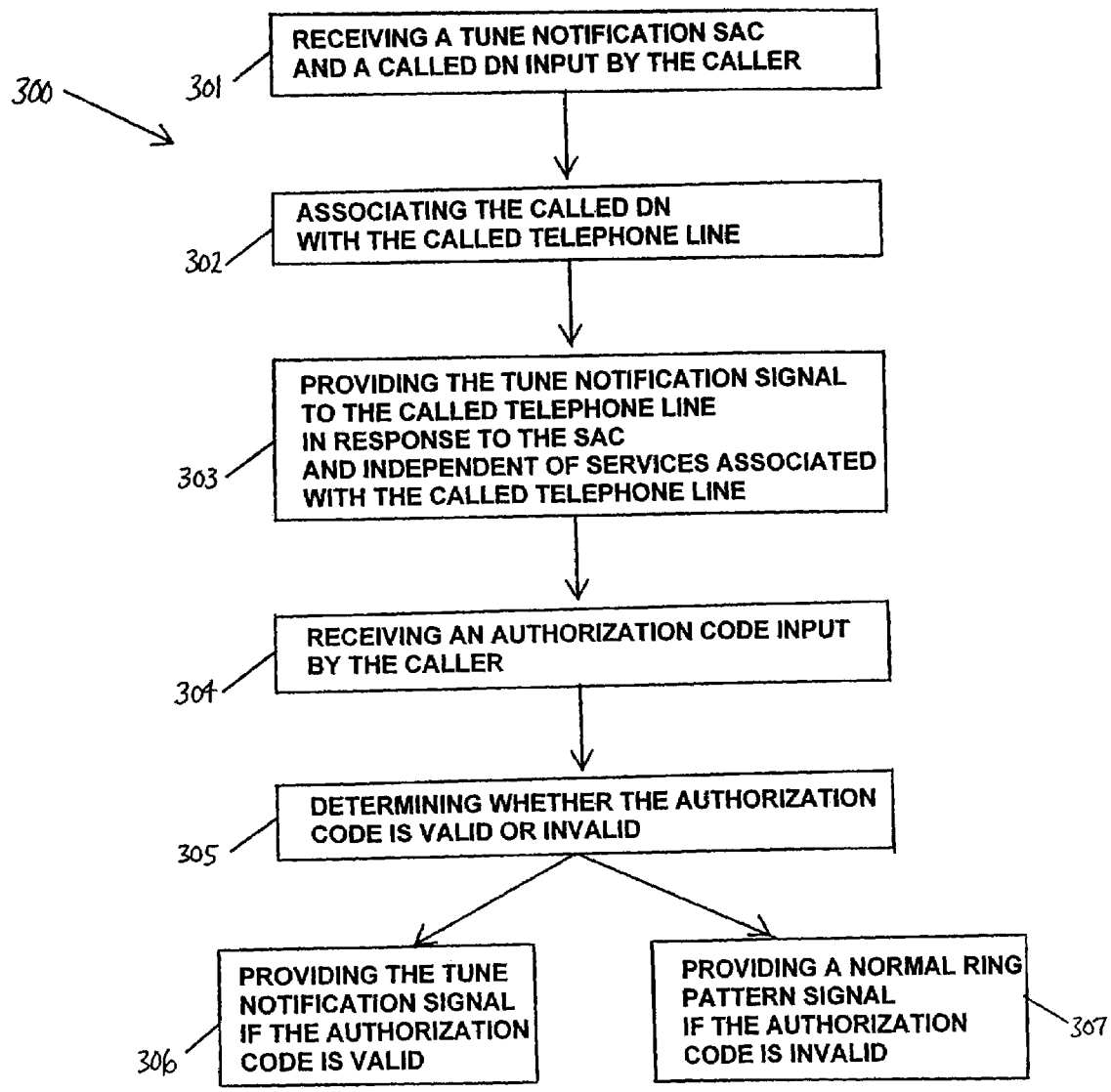
FIG. 4 is flow diagram illustrating another method of processing a call placed by a calling party to a called telephone line in a telephone network in an embodiment of the present invention.

In another embodiment, a method of the present invention for a caller to control a tune notification signal applied to a called telephone line includes a telephone network providing a plurality of services. As shown in FIG. 4, in the method 300, a calling party inputs a tune notification service access code (SAC) and a called directory number (DN) by dialing the access code and directory number on a telephone. The SAC and DN are sent to a SSP in the telephone network. The SSP routes the SAC and DN to a SCP. The SCP includes a database comprising directory numbers associated with telephone lines (302). The SCP searches the database for a telephone line associated with the dialed directory number.

If the SCP locates a telephone line associated with the dialed directory number the SCP activates a software application in response to send to the calling party's telephone a list of available tunes from which a desired tune can be selected. The list of tunes can be sent to the calling party's telephone using an interactive voice program or with electronic signals representing a list of tunes that are displayed on a screen on the caller's telephone. The caller selects a tune by entering the number on the telephone keypad associated with the desired tune in the voice menu or on the display screen. The SCP then sends the selected tune notification signal to the called telephone line in response to the SAC and independent of services associated with the called telephone line (303).

The method 300 further includes an authorization process. After inputting a tune notification service access code and a called directory number, the calling party inputs an authorization code. The SSP receives the authorization code input by the caller (304). After the SSP receives the authorization code, the SSP then sends a query, including the authorization code, to the SCP. The SCP then determines whether the authorization code is valid or invalid. To determine validity of the authorization code, the SCP searches a database comprising authorization codes associated with calling party identification information. If the authorization code for sending a tune notification to the called line directory number is associated with the calling party identification information, the SCP validates the called party authorization code. The SCP then generates a response to the query. If the authorization code is validated, the SCP provides a tune notification signal in the response and independent of services associated with the called directory number (306). If the SCP determines that the authorization code is invalid, the SCP provides a normal ring pattern signal in the response (307). The SCP then sends the response to the SSP. After receiving the tune notification signal, the SSP processes the call and the SSP applies the tune notification signal to the called telephone line.

Although the present invention has been described with reference to particular embodiments, it should be recognized that these embodiments are merely illustrative of the principles of the present invention. Those of ordinary skill in the art will appreciate that systems and methods for caller-controlled tune notification of a call of the present invention may be constructed and implemented in other ways and embodiments. Accordingly, the description herein should not be read as limiting the present invention, as other embodiments also fall within the scope of the present invention.

What is claimed is:

1. A system for caller control of a tune notification, comprising:
   a first network element operable to:
      receive a service access code for a tune notification service and a called directory number input by a calling party placing a call, and
      issue a query in response to receiving the service access code; and
   a second network element in communication with the first network element over a communication path, the second network element operable to:
      provide a list of tune categories to a device associated with the calling party,
      after providing the list of tune categories to the device associated with the calling party, receive a selection of one of the tune categories from the list of tune categories,
      after receiving the selection from the list of tune categories, provide a list of tunes to the device associated with the calling party,
      after providing the list of tunes to the device, receive a selection of one of the tunes from the list of tunes, and
      wherein upon receiving the selection of one of the tunes from the second network element, the first network element processes the call to causes the tune notification to be applied to a called telephone line associated with the called directory number.

2. The system of claim 1, wherein upon receiving the query from the first network element, the second network element provides a list of tunes from which the calling party can select a desired tune to be used as notification of the call.

3. The system of claim 1, wherein the first network element is further operable to receive an authorization code and include the authorization code in the query; and
   wherein the service control point is further operable to determine whether the authorization code is valid and provide the tune notification signal only upon determining that the authorization code is valid.

4. The system of claim 3, wherein the authorization code comprises a unique code associated with the called directory number.

5. The system of claim 3, wherein the authorization code comprises a unique code associated with the calling party.

6. The system of claim 1, the first network element comprising a first service switching point in communication with the service control point over a first communication path, further comprising a second service switching point serving the called directory number and in communication with the first service switching point over a second communication path, and wherein the first service switching point provides the second service switching point the tune notification signal received from the second network element.

7. The system a claim 1, wherein the tune notification service comprises a plurality of tunes accessible to tune notification service subscribers for storing on a call terminating device.

8. The system of claim 1, wherein a call terminating device associated with the called directory number is operable to play the tune notification upon receiving the tune notification signal.

9. The system of claim 1, further comprising:
   a media server in a packet-based network; and
   a media gateway for converting data into and out of packets for transmission between a circuit-switched network and the packet-switched network.

10. A method for processing a call placed by a calling party to a called telephone line in a network, the network comprising a first network element, a second network element, and a third network element, the third network element in communication with the first and second network elements over first and second communications, respectively, the method comprising:
   receiving at the first network element a tune notification service access code and a called directory number, the call directory number associated with the called telephone line;
   sending a query from the first network element to the third network element after receiving the service access code;
   providing a list of tune categories to a device;
   after providing the list of tune categories, receiving a selection of one of the tune categories from the list of tune categories;
   after receiving the selection from the list of tune categories, providing a list of tunes;
   after providing the list of tunes, receiving a selection of one of the tunes from the list to tunes;
   sending the selection of one of the tunes to the first network element; and
   applying the tune to the called telephone line.

11. The method of claim 10, further comprising:
   receiving at the first network element an authorization code;
   including the authorization code in the query;
   determine at the third network element whether the authorization code is valid or invalid, and
   providing the tune when the authorization code is valid.

12. The method of claim 11, further comprising associating the called directory number with the authorization code.

13. The method of claim 11, further comprising associating the calling party directory number with the authorization code.

14. The method of claim 11, further comprising:
providing a list of tunes to the calling party after determining that the authorization code is valid; and
selecting a desired tune from the list of tunes to be used as notification of the call.

15. The method of claim 11, wherein the step of sending the query from the first network element to the third network element after receiving the service access code is independent of a calling telephone line from which the service access code is received.

16. The method of claim 10, wherein the second network element serves the called telephone line, the method further comprising sending from the first network element to he second network element the tune notification signal received from the third network element.

17. The method of claim 10 further comprising providing a plurality of tunes accessible to tune notification service subscribers for storing on a call terminating device.

18. The method of claim 10, wherein providing the tune associated with the tune selection to the called telephone line is independent of services associated with the called telephone line.

19. A method for a caller to control a tune notification signal applied to a called telephone line in a telephone network providing a plurality of services, the method comprising;
receiving a tune notification service access code and a called directory number input by the caller;
providing a list of tune categories to a device associated with the caller;
after providing the list of tune categories, receiving a selection of one of the tune categories from the list of tune categories;
after providing the list of tune categories, providing a list of tunes;
after providing the list of tunes, receiving a selection on one of the tunes; and
providing a tune notification signal associated with the tune notification selection to the called telephone line.

20. The method of claim 19, further comprising
receiving an authorization code input by the caller;
determining whether the authorization code is a valid code or an invalid code;
providing the tune notification signal to the called telephone line in response to the service access code and independent of services associated with the called directory number if the authorization code is a valid code; and
providing a normal ring pattern signal to the called telephone line if the authorization code is an invalid code.

* * * * *